March 22, 1938. W. T. BRAND 2,111,748
DEVICE FOR MELTING HONEY CAPPINGS
Filed March 23, 1936 2 Sheets-Sheet 2
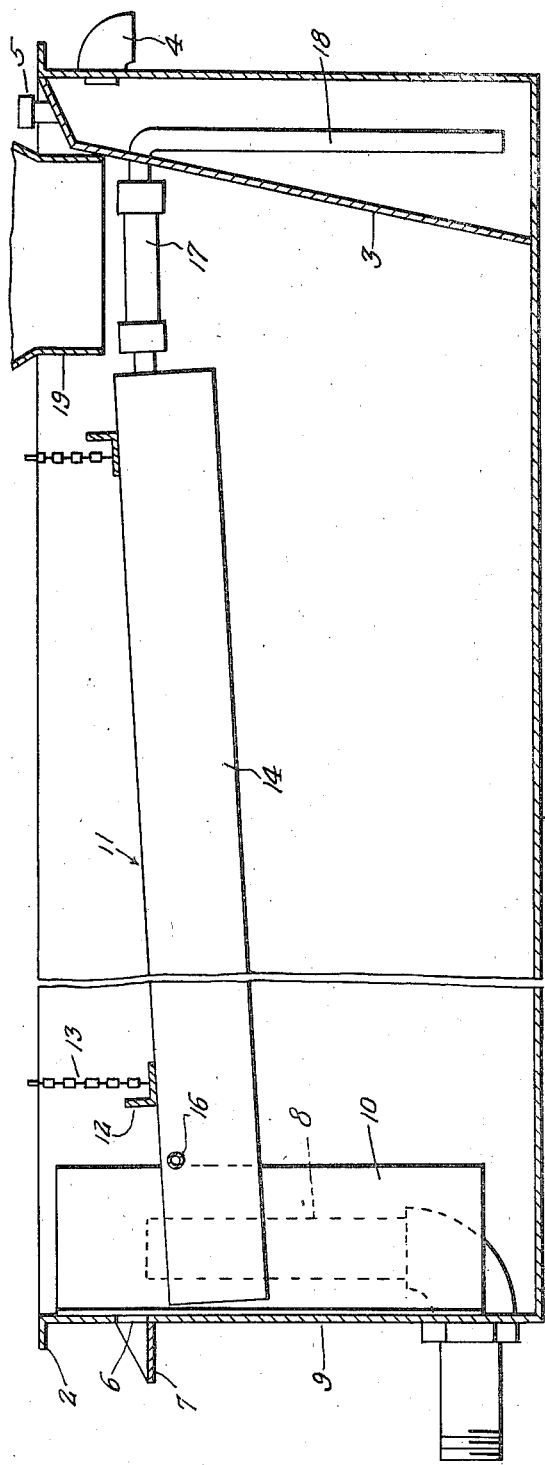
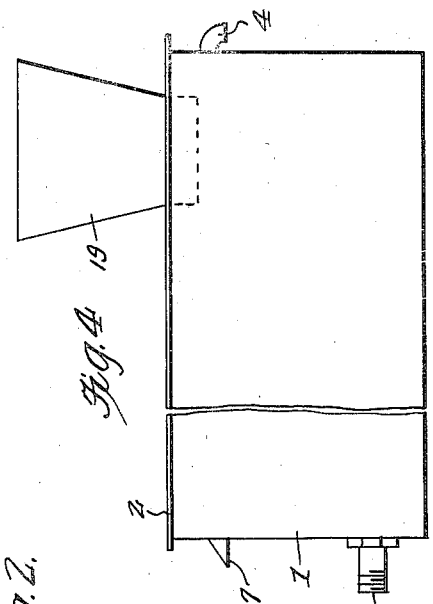
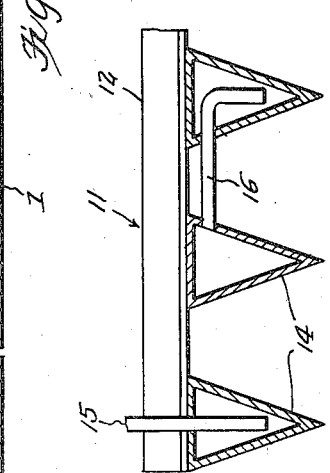
Inventor
W. T. Brand,
By Clarence A. O'Brien and
Hyman Berman
Attorneys Patented Mar. 22, 1938

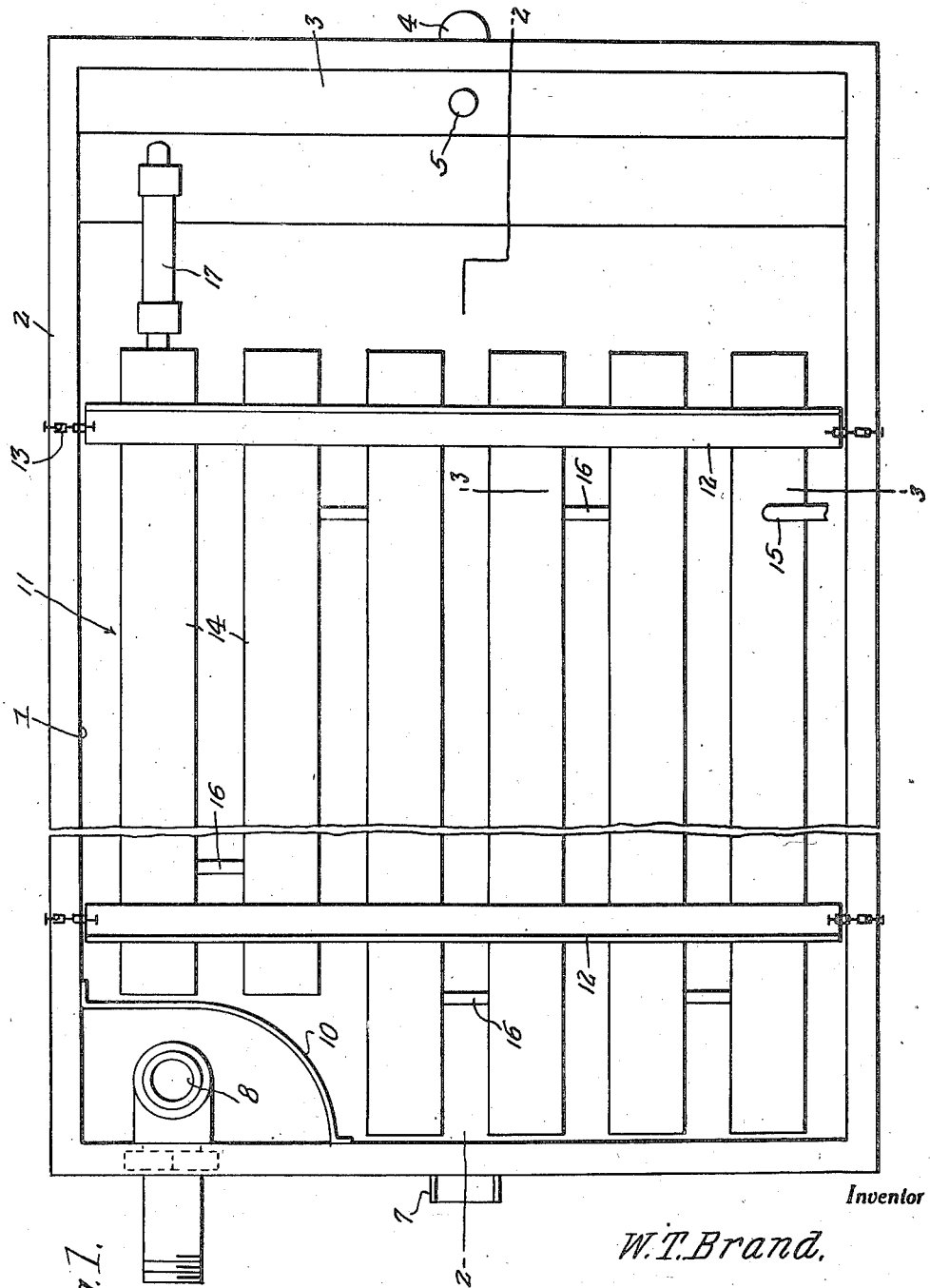

2,111,748

UNITED STATES PATENT OFFICE 2,111,748

DEVICE FOR MELTING HONEY CAPPINGS

William T. Brand, Mitchell, Nebr.

Application March 23, 1936, Serial No. 70,510

5 Claims. (Cl. 87—19)

The present invention relates to new and useful improvements in devices for and methods of melting honey cappings and has for its primary object to provide, in a manner as hereinafter set forth, a novel apparatus and method of this character through the medium of which the cappings may be heated and melted from the top, instead of the bottom, as at present.

Other objects of the invention are to provide a device of this character which will be simple in construction, strong, durable, highly efficient and reliable in use, compact, light in weight and which may be manufactured and operated at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a top plan view of an apparatus constructed in accordance with the present invention.

Figure 2 is a view in vertical longitudinal section, taken substantially on the line 2—2 of Figure 1, the hopper being omitted.

Figure 3 is a fragmentary view in vertical transverse section, taken substantially on the line 3—3 of Figure 1.

Figure 4 is a view in side elevation of the invention.

Referring now to the drawings in detail, it will be seen that the embodiment of the apparatus which has been illustrated comprises a tank or container 1 of suitable dimensions and material, said tank or container being open at its top and including an external flange 2. Formed in one end portion of the container 1 is a steam condensing chamber or tank 3 the upper portion of which is provided with an outlet 4. A filling neck 5 is provided for the tank 3.

In an upper portion of the other end of the container 1 is a wax outlet opening 6 from which a spout 7 extends. Also mounted in this end portion of the container 1 is a vertical honey outlet pipe 8 which extends through the end wall 9 of said container 1. A shield 10 prevents wax from entering the honey outlet pipe 8.

Suspended in the upper portion of the container 1 is a removable, inclined heating unit which is designated generally by the reference numeral 11. The unit 11 comprises transverse bars 12 of angle iron cross section which are provided with supporting chains 13. Secured beneath the bars 12 is a series of spaced, parallel, longitudinally extending tubes 14 which, as illustrated to advantage in Figure 3 of the drawings, are substantially triangular in cross section.

The tubes 14 are for the reception of hot water, said water being kept hot through the medium of steam which is introduced from a suitable source of supply through an inlet pipe 15 which enters the upper end portion of one of the outer tubes 14 and extends to a point adjacent the bottom thereof (see Fig. 3). The tubes 14 are connected in a manner to provide a continuous passage through the medium of connecting pipes 16 the discharge ends of which extend downwardly, as also shown to advantage in Figure 3 of the drawings. It will be observed that the connecting pipes 16 between the tubes 14 are staggered.

The upper end of the other outermost tube 14 is connected by a flexible coupling 17 to a pipe 18 which extends to a point adjacent the bottom of the tank 3. As will be apparent, the flexible coupling 17 permits movement of the heating unit 11 in the container 1. The reference numeral 19 designates a hopper through the medium of which the honey cappings enter the container 1 between the upper end of the tubes 14 and the tank 3.

Briefly, the operation of the apparatus is substantially as follows:—

Water having been placed in the tubes 14, steam is introduced into said tubes through the inlet pipe 15, said steam circulating through said tubes and the connecting pipes 16 for heating the water and, of course, said tubes 14. The honey cappings are deposited in the container 1 from the hopper 19 and flow beneath the heating unit 11 toward the discharge end of said container 1.

As the wax is considerably lighter than the honey, said wax rises to the top and contacts the tubes 14 and is melted thereby, the wax then flowing from the container 1 through the discharge opening 6. It will thus be seen that the honey is not subjected to heat of a sufficiently high temperature to be damaged in any way thereby. The honey, from which the wax has been separated, passes upwardly in the shield 10 from the lower end thereof and is discharged through the pipe 8. The supporting chains 13 and the flexible coupling 17 facilitate raising the heating unit 11 to permit the removal of wax refuse or for any other purpose.

It will be noted that the steam enters the substantially triangular or V-shaped tubes 14 below the surface of the water in said tubes. After leaving the tubes 14 the steam enters the condensing tank 3 through the flexible coupling 17 and the pipe 18. The water may be placed in the tubes 14 by filling the tank 3 through the neck 5, said water backflowing through the pipe 18 and the flexible coupling 17.

It is believed that the many advantages of the invention will be readily understood, particularly by those skilled in the art to which said invention pertains, and although a preferred embodiment is as illustrated and described, it is to be understood that changes in details may be resorted to which will fall within the scope of the invention as claimed.

What is claimed is:—

1. A device for separating intermixed wax and honey comprising: a container; a honey overflow from said container positioned to determine the fluid level therein; a shielding chamber for said honey overflow communicating with said container below the fluid level therein; a wax overflow communicating with said container substantially at the fluid level therein; and heating means positioned in said container at said fluid level.

2. A device for separating intermixed wax and honey comprising: a container; a honey overflow from said container positioned to determine the fluid level therein; a shielding chamber for said honey overflow communicating with said container below the fluid level therein; a wax overflow communicating with said container substantially at the fluid level therein; heating means positioned in said container at said fluid level, said honey overflow being positioned at one extremity of said container; and means for feeding wax and honey into the opposite extremity of said container.

3. A device for separating intermixed wax and honey comprising: a container; a honey overflow from said container positioned to determine the fluid level therein; a shielding chamber for said honey overflow communicating with said container below the fluid level therein; a wax overflow communicating with said container substantially at the fluid level therein; heating means positioned in said container at said fluid level, said honey overflow and said wax overflow being positioned at one extremity of said container; and a feed member positioned between said heating means and the opposite extremity of said container for feeding wax and honey thereto.

4. A device for separating intermixed wax and honey comprising: a container; a honey overflow from said container positioned to determine the fluid level therein; a shielding chamber for said honey overflow communicating with said container below the fluid level therein; a wax overflow communicating with said container substantially at the fluid level therein, said wax and honey overflows being positioned at one extremity of said container; means for feeding wax and honey into said container at the opposite extremity thereof; and a series of elongated parallel heating elements supported in said tank at the horizontal plane of said overflows, and between the latter and said means for feeding.

5. A device for separating intermixed wax and honey comprising: a container; a honey overflow from said container positioned to determine the fluid level therein; a shielding chamber for said honey overflow communicating with said container below the fluid level therein; a wax overflow communicating with said container substantially at the fluid level therein, said wax and honey overflows being positioned at one extremity of said container; means for feeding wax and honey into said container at the opposite extremity thereof; and a series of elongated parallel heating elements supported in said tank at the horizontal plane of said overflows, and between the latter and said means for feeding, said heating elements being inclined to a lower elevation adjacent said overflows.

WILLIAM T. BRAND.